United States Patent
Koch et al.

(10) Patent No.: US 7,988,056 B2
(45) Date of Patent: Aug. 2, 2011

(54) CODE CARRIER AND CODECARRIER-SET

(75) Inventors: Gunther Koch, Weinheim (DE); Mark Piontek, Neustadt/Weinstrasse (DE)

(73) Assignee: Pepperl + Fuchs, GmbH, Mannheim (DE)

( * ) Notice: Subject to any disclaimer, the term of this patent is extended or adjusted under 35 U.S.C. 154(b) by 1333 days.

(21) Appl. No.: 11/497,071

(22) Filed: Aug. 1, 2006

(65) Prior Publication Data

US 2007/0273483 A1 Nov. 29, 2007

(30) Foreign Application Priority Data

Aug. 2, 2005 (DE) .................. 20 2005 012 295 U

(51) Int. Cl.
*G06K 19/06* (2006.01)

(52) U.S. Cl. .................. 235/492; 235/380; 235/375

(58) Field of Classification Search .......... 235/492, 235/451, 380, 375
See application file for complete search history.

(56) References Cited

U.S. PATENT DOCUMENTS

| | | | |
|---|---|---|---|
| 4,752,776 A | 6/1988 | Katzenstein |
| 5,245,332 A | 9/1993 | Katzenstein |
| 5,450,088 A | 9/1995 | Meier |
| 5,548,291 A | 8/1996 | Meier |

FOREIGN PATENT DOCUMENTS

| | | |
|---|---|---|
| DE | 3824870 | 7/1988 |
| DE | 3824870 | 4/1989 |
| DE | 3920050 | 1/1991 |
| DE | 4001163 | 1/2000 |
| EP | 0245605 | 11/1987 |
| EP | 0347893 | 12/1989 |

*Primary Examiner* — Edwyn Labaze
(74) *Attorney, Agent, or Firm* — Horst M. Kasper

(57) ABSTRACT

The invention relates to a code carrier that has a code carrier coil, whereby the code carrier coil is configured as a ring shaped like a triangle or the projection of the code carrier coil in the direction of the coil axis is shaped like a triangle. The code carrier coil or the code carrier, including the code carrier coil, is part of a cap that can be placed onto a corner of a cuboidal object and that functions as a physical corner protector, whereby the coil axis intersects the planes encompassed by the side surfaces of the object, all at an angle between 5° and 85°, and a body diagonal of the object pierces the triangle. The invention also relates to a code carrier set consisting of an object having a base area with a first edge and a second edge running obliquely, crosswise or perpendicular to the first edge, and consisting of a code carrier that is arranged on or in the object and that has a code carrier coil, whereby the perpendicular projection of the coil axis onto the base area runs obliquely to the first and second edges of the base area.

27 Claims, 5 Drawing Sheets

CODE CARRIER AND CODECARRIER-SET

FIELD OF THE INVENTION

Figure 1:
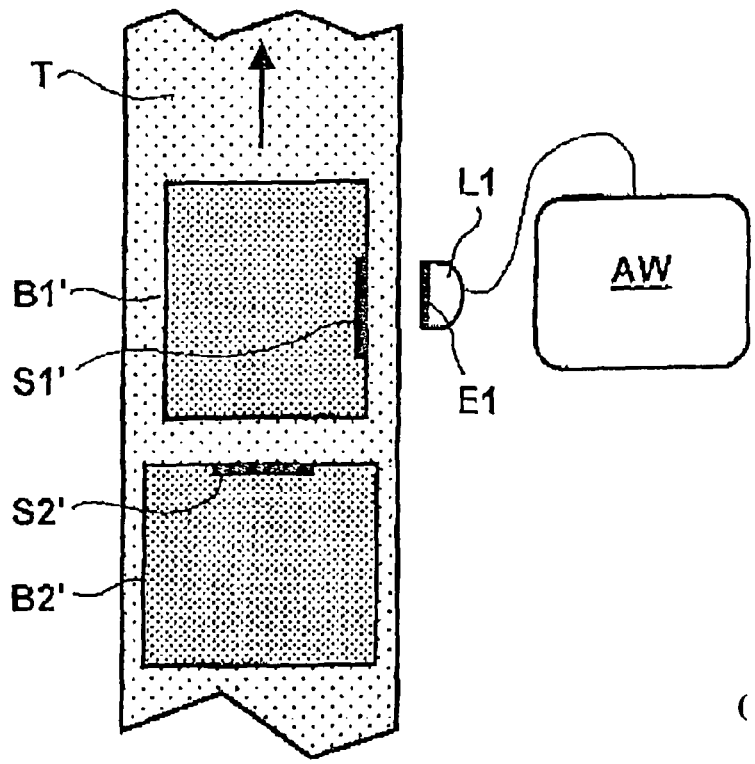

The invention relates to a code carrier that has a data storage unit containing a data code as well as a code carrier coil and that is capable of inductively transmitting this data code via the code carrier coil to a partner device, and it relates to a code carrier set consisting of an object and of a code carrier arranged on or in the object, said code carrier having a data storage unit containing a data code associated with the object or with its contents as well as a code carrier coil and being capable of inductively transmitting this data code via the code carrier coil to a partner device, and it also relates to a code carrier set consisting of at least a code carrier that is arranged on an object and that has a code carrier coil, consisting of a partner device that is situated at a distance from the object and that has a partner coil, and consisting of a conveying device by means of which the object, along with the code carrier, can be transported in at least one conveying direction, or else consisting of a transporting device by means of which the partner device can be transported in at least one transporting direction, whereby the code carrier is capable of communicating inductively with the partner device via the code carrier coil and via the partner coil.

DESCRIPTION OF RELATED ART

Inductive code carriers are known that have a data storage unit and that are capable of inductively transmitting data stored there to a detection device. For this purpose, the code carriers each have a code carrier coil and the detection device has a receiving coil. The detection device is generally connected to a computer for decrypting and evaluating the data.

Such code carriers are often attached as a standard feature onto objects—onto articles to be shipped in the case of shipping systems or else onto containers or pallets holding stored goods in the case of warehousing—whereby the stored data unambiguously identifies or classifies the object or indicates its contents. In this manner, the organization of the shipping or of the warehouse management is considerably simplified, since the material flow can be continuously monitored electronically by means of the code carriers when the objects are moved past the receiving coil, for example, by conveyor belts, forklifts or fully automatic robotic transporting devices.

Normally, the code carrier coils are attached to a surface of the object parallel thereto, for example, in the form of a film, in order to prevent the transmitting coils from projecting beyond the surface of the object. Here, the code carrier coils are normally attached to the surface of the object that, during the transportation, is across from the receiving coil while the object is passing the receiving coil, i.e. the surface of the code carrier coil is parallel to the direction of movement while the axis of the code carrier coil is positioned perpendicular to the direction of movement.

Such an arrangement, however, is disadvantageous, for example, if the direction of movement of the object relative to its orientation can change, for example, when the object is being transported on a conveyor belt that, via branches, opens up into side branches next to which one or more additional receiving coils are arranged. These receiving coils cannot read out the data since, while the code carrier coil is passing the additional receiving coil, the code carrier coil is positioned perpendicular to the receiving coil. This problem has to be taken into consideration in selecting the geometry of the transporting device, which constitutes a limitation to the design possibilities and entails considerable technical effort.

In order to identify transportation containers, tool parts, etc., the data carriers and the read/write heads are normally mounted in such a way that the coil axis of the data carrier and the coil axis of the read/write head match at the point in time of the reading or writing.

In many applications, for example, in transportation logistics, in a sorting or production process, among others, however, there is also a need to detect parts whose spatial position is unknown during the detection. This can be caused by the fact that the object to be detected is laid onto a conveyor belt in differing positions or that the object changes in its direction of movement during the manufacturing process (e.g. caused, for instance, by lengthwise or crosswise conveyors).

German patent application DE 101 60 452 A1 discloses a code carrier device to be mounted onto an object that is part of a material flow, said device comprising a transmission device with two transmitting coils arranged crosswise to each other so that the data is emitted inductively in two different directions. In this manner, the above-mentioned drawbacks can be reduced, but not completely eliminated since, even when such a transmission device is used, the above-mentioned limitation still exists in part. Moreover, the use of two transmitting coils is complicated, expensive and associated with either the need for a higher transmission power on the part of the transmission device or else with drawbacks in terms of the range of the data transmission to the receiving coil.

Such a code device entails a complicated structure since at least two coils are used. Moreover, the reading range is reduced since the magnetic field can flow through the second coil in the negative direction.

Another essential drawback of the code carrier device of German patent application DE 101 60 452 A1 lies in the fact that the electromagnetic fields of the two transmitting coils are superimposed, as a result of which destructive interference occurs in certain places and thus, in total, there are zones in which only a greatly weakened field or no field at all is generated. Consequently, "blind zones" are formed in the vicinity of the code carrier of German patent application DE 101 60 452 A1, in which no data transmission is possible if the receiving coil is situated in such a blind zone. Therefore, when the object that is part of a material flow moves along with the code carrier, for example, on a conveyor belt, the possibility of transmitting data to the receiving device is position-dependent and thus also time-dependent to a great extent and in a complicated manner. As a result, an automatic detection, regulation and control of the material flow is made difficult and becomes prone to malfunction.

Technical Objective:

The invention is thus based on the objective of eliminating the above-mentioned limitations and drawbacks or of at least considerably reducing them and of making it possible to read out the codes with a simple arrangement having a long reading range.

A1 This objective is achieved according to the invention by means of a code carrier that has a code carrier coil and that is capable of communicating inductively with a partner device via the code carrier coil, whereby the code carrier coil is configured as an open or closed ring shaped like a triangle or the projection of the code carrier coil in the direction of the coil axis of the code carrier coil is shaped like a triangle, and the code carrier coil or the code carrier, including the code carrier coil, is part of a cap that can be placed from the outside in a stable position onto the area of a corner of a cuboidal object in such a way that the cap covers the area of this corner of the object, functioning as a physical corner protector, whereby the coil axis of the code carrier coil intersects the planes encompassed by the six side surfaces of the cuboidal object, all at an angle between 5° and 85°, preferably at an angle between 30° and 60°, and a body diagonal of the cuboidal object pierces the interior of the triangle.

A2 Preferably, the code carrier has a data storage unit containing a data code and it is capable of inductively transmitting this data code via the code carrier coil to the partner device.

Therefore, according to this embodiment, the code carrier is capable of emitting the data code inductively to the partner device and consequently, in this case, it can function as a code transmitter and can thus be referred to as a code transmitter. According to this embodiment, the code carrier coil is capable of functioning as a transmitting coil for emitting the data code and therefore, in this case, it can be referred to as a transmitting coil. By the same token, the partner device can be referred to as a detection device or as a receiving device.

According to a preferred embodiment, the code carrier is thus a code transmitter that has a data storage unit containing a data code as well as a transmitting coil and that is capable of inductively transmitting this data code via the transmitting coil to a detection device, whereby
    the transmitting coil is configured as an open or closed ring shaped like a triangle or else the projection of the transmitting coil in the direction of the coil axis is shaped like a triangle,
    the transmitting coil or the code transmitter, including the transmitting coil, is part of a cap that can be placed from the outside in a stable position onto the area of a corner of a cuboidal object in such a way that
        the cap covers the area of this corner of the object, functioning as a physical corner protector,
        the coil axis of the transmitting coil intersects the planes encompassed by the six side surfaces of the cuboidal object, all at an angle between 5° and 85°, preferably at an angle between 30° and 60°, and
        a body diagonal of the cuboidal object pierces the interior of the triangle.

The planes encompassed by the six side surfaces of the cuboidal object refer to those planes in which the above-mentioned side surfaces lie.

A3 The objective is also achieved according to the invention by means of a code carrier set, consisting of at least one object having a base area with a first edge and a second edge running obliquely, crosswise or perpendicular to the first edge, and consisting of a code carrier that is arranged on or in the object and that has a code carrier coil and that is capable of communicating inductively via the code carrier coil with a partner device situated at a distance from the object, whereby in each case, the perpendicular projection of the coil axis of the code carrier coil onto the base area of the object runs obliquely to the first and second edges of the base area of the object.

The code carrier of the code carrier set is preferably capable of transmitting the data code inductively to the partner device and consequently, in this case, it can function as a code transmitter and can thus be referred to as a code transmitter. The code carrier coil is preferably capable of functioning as a transmitting coil for emitting the data code and therefore, in this case, it can be referred to as a transmitting coil. In these cases, the code carrier set can be referred to as a code transmitter set. By the same token, the partner device can be referred to as a detection device or as a receiving device.

Therefore, according to a preferred embodiment, the code carrier set is a code transmitter set, consisting of at least an object having a base area with a first edge and a second edge running obliquely, crosswise or perpendicular to the first edge, and consisting of a code transmitter that is arranged on or in the object and that has a data storage unit containing a data code associated with the object or with its contents and that has a transmitting coil and that is capable of inductively transmitting this data code via the transmitting coil to a detection device that is situated at a distance from the object, thereby supplying information associated with the object or with its contents to the detection device, whereby in each case, the perpendicular projection of the coil axis of the transmitting coil onto the base area of the object runs obliquely to the first and second edges of the base area of the object.

In this context, the edges of the base area refer to the boundary lines of the base area.

A4 The perpendicular projection of the coil axis of the code carrier coil onto the base area of the object preferably runs in each case at an angle between 5° and 85°, preferably at an angle between 30° and 60°, with respect to the first and second edges of the base area. A5 Moreover, the coil axis of the code carrier coil is preferably oriented obliquely to the base area of the object. A6 The coil axis of the code carrier coil preferably intersects the plane encompassed by the base area at an angle between 5° and 85°, preferably at an angle between 30° and 60°. The plane encompassed by the base area refers to the plane in which the base area lies.

A7 The objective is also achieved by a code carrier set, consisting of at least a code carrier that is arranged on an object and that has a code carrier coil, consisting of a partner device that is situated at a distance from the object and that has a partner coil, consisting of a conveying device by means of which the object, along with the code carrier, can be transported in at least one conveying direction, or else consisting of a transporting device by means of which the partner device can be transported in at least one transporting direction, whereby the code carrier is capable of communicating inductively with the partner device via the code carrier coil and via the partner coil, and whereby the direction of the coil axis of the partner coil is slanted relative to at least one of the conveying directions or relative to at least one of the transporting directions by an angle between 5° and 85°, preferably by an angle between 30° and 60°.

According to a preferred embodiment, the partner device, or at least the partner coil, is stationary and directionally stable so that the position and the spatial orientation of the coil axis of the partner coil do not change. For this purpose, the partner device can be attached or mounted, for example, rigidly onto a stationary substrate or onto a stationary support.

According to another preferred embodiment, the partner device is arranged directionally stably on the transporting device, that is to say, it is arranged on the transporting device in such a way that the spatial orientation of the coil axis of the partner coil does not change when the partner device is transported by means of the transporting device.

The coil axis of the partner coil is preferably oriented in such a way that the coil axis of the code carrier coil cannot be oriented perpendicular to the coil axis of the partner coil, but rather, a directional difference of 85° at the most always exists between the two coil axes.

According to a variant, the code carrier set consists at least of one code carrier that is arranged on an object and that has a code carrier coil, of a partner device that is situated at a distance from the object and that has a partner coil, and of a conveying device by means of which the object, along with the code carrier, can be transported in at least one conveying direction, whereby the code carrier is capable of communicating inductively with the partner device via the code carrier coil and via the partner coil, and whereby the direction of the coil axis of the partner coil is slanted relative to at least one, preferably relative to more than one, of the conveying directions, by an angle between 5° and 85°, preferably by an angle between 30° and 60°.

The direction of the coil axis of the partner coil is preferably slanted relative to all of the conveying directions by an angle between 5° and 85°, preferably by an angle between 30° and 60°. The number of conveying directions can be, for example, two or three. The conveying directions do not have to be perpendicular to each other.

Preferably, the object, along with the code carrier, can be transported by means of the conveying device in two conveying directions situated perpendicular to each other, whereby the direction of the coil axis of the partner coil is slanted relative to both of the conveying directions by an angle between 5° and 85°, preferably by an angle between 30° and 60°.

According to another variant, the code carrier set consists at least of one code carrier that is arranged on an object and that has a code carrier coil, of a partner device that is situated at a distance from the object and that has a partner coil, and of a transporting device by means of which the partner device can be transported in at least one transporting direction, whereby the code carrier is capable of communicating inductively with the partner device via the code carrier coil and via the partner coil, and whereby the direction of the coil axis of the partner coil is slanted relative to at least one, preferably relative to more than one, of the transporting directions, by an angle between 5° and 85°, preferably by an angle between 30° and 60°.

The direction of the coil axis of the partner coil is preferably slanted relative to all of the transporting directions by an angle between 5° and 85°, preferably by an angle between 30° and 60°. The number of transporting directions can be, for example, two or three. The transporting directions do not have to be perpendicular to each other.

Preferably, the partner device can be transported by means of the transporting device in two transporting directions situated perpendicular to each other, whereby the direction of the coil axis of the partner coil is slanted relative to both of the transporting directions by an angle between 5° and 85°, preferably by an angle between 30° and 60°.

The partner device is the communication partner of the code carrier, whereby the communication is possible in an inductive manner either unidirectionally or bidirectionally, depending on the embodiment of the invention. The communication preferably comprises the transmission of data, especially digital data.

A8 According to a preferred embodiment of the code transmitter set, at least two of the conveying directions lie in one conveying plane, whereby the direction of the coil axis of the partner coil is slanted relative to the conveying plane by an angle between 5° and 85°, preferably by an angle between 30° and 60°. According to an embodiment of the code transmitter set, all of the conveying directions lie in one conveying plane, whereby the direction of the coil axis of the partner coil is slanted relative to the conveying plane by an angle between 5° and 85°, preferably by an angle between 30° and 60°.

According to another preferred embodiment of the code transmitter set, at least two of the transporting directions lie in one transporting plane, whereby the direction of the coil axis of the partner coil is slanted relative to the transporting plane by an angle between 5° and 85°, preferably by an angle between 30° and 60°. According to an embodiment of the code transmitter set, all of the transporting directions lie in one transporting plane, whereby the direction of the coil axis of the partner coil is slanted relative to the transporting plane by an angle between 5° and 85°, preferably by an angle between 30° and 60°.

A9 At least one of the conveying directions lies in the horizontal, whereby the direction of the coil axis of the partner coil is slanted relative to the horizontal by an angle between 5° and 85°, preferably by an angle between 30° and 60°. According to another variant, at least one of the transporting directions lies in the horizontal, whereby the direction of the coil axis of the partner coil is slanted relative to the horizontal by an angle between 5° and 85°, preferably by an angle between 30° and 60°.

In this embodiment, it is always advantageously possible to transmit data between the code carrier and the partner device when the object is cuboidal, is lying on a horizontal substrate and the code carrier coil is arranged parallel to a vertical or horizontal wall of the cuboid, since then the axes of the code carrier coil and of the partner coil always run obliquely to each other in any orientation of the object that is lying on its horizontal substrate (whereby said axes do not have to intersect each other). Consequently, the orientation of the object lying on its horizontal substrate, for example, a warehouse shelf or a conveyor belt, does not matter as long as the top of the cuboid is horizontal. This is very advantageous in actual practice since there is no need for measures that bring about a specific orientation of the object on its substrate, in order to prevent the axes of the code carrier coil and of the partner coil from being positioned perpendicular to each other when the data transmission is to take place.

A10 The code carrier and the partner device can especially be parts of a logistics system that is used to automatically take the object to a prescribed place. The logistics system can be capable, for example, of querying the identity or the contents of the object by means of inductive data transmission from the code carrier to the partner device and, as a function of the result of this query, it is capable of using the conveying device to take the object to a specific place, for example, to a specific loading dock or to a specific delivery site.

By the same token, the code carrier and the partner device can be parts of a warehousing system, whereby the object can be or can hold goods to be stored and, by means of the warehousing system, the object can be automatically located and/or taken to a prescribed storage place.

The warehousing system can be capable of using the partner device to query the type or contents of newly arrived objects that are to be stored and that have been provided with a code carrier having individual storage contents, and then, depending on the result of the query, the system can use the conveying device to take the object to a specific place in the warehouse.

The warehousing system, for instance, in order to inventory the warehouse, can be capable of querying the current storage site and/or the contents of the object by means of inductive data transmission from the code carrier to the partner device. For this purpose, the partner device can be transported by means of the transporting device and consecutively brought to the vicinity of all objects stored in the warehouse, whereby each stored object is provided with a code carrier indicating individual data contents. After all of the objects have been accessed and all of the code carriers have been queried by the partner device, the warehouse is inventoried without the objects having to be moved for this purpose.

According to a preferred embodiment of the code transmitter set, the object, along with the code carrier, can be transported in at least two conveying directions by the conveying device, whereby the direction of the coil axis of the partner coil is slanted relative to the plane, the conveying plane, encompassed by these two conveying directions by an angle between 5° and 85°, preferably by an angle between 30° and 60°. According to another preferred embodiment of the code transmitter set, the partner device can be transported in at least two transporting directions by the transporting device, whereby the direction of the coil axis of the partner coil is slanted relative to the plane, the conveying plane, encompassed by these two conveying directions by an angle between 5° and 85°, preferably by an angle between 30° and 60°.

For example, in a warehouse, especially a high-bay warehouse, several or numerous, for example, cuboidal or cylindrical objects can each be stored with a code carrier having a code carrier coil that is arranged parallel to a side surface of the appertaining cuboidal object or parallel to a cover surface of the appertaining cylindrical object, whereby the objects lie on flat substrates, for example, on shelves, so that the coil axes of the code carrier coils are oriented essentially vertically or horizontally (with otherwise any random orientation of the objects and of the code carrier coils), and whereby the partner device can be transported by means of the transporting device in a directionally stable manner, that is to say, with a fixed, unchangeable orientation of the coil axis of the partner coil in space, horizontally in the x-direction, optionally at a right angle thereto likewise horizontally in the y-direction and vertically in the z-direction, and the coil axis of the partner coil is slanted relative to the horizontal by an angle between 5° and 85°. Thus, it is ensured that the direction of the coil axis of the partner coil always differs from the direction of the coil axes of all of the code carrier coils by an angle between 5° and 85°. In this manner, the partner device can communicate with all of the code carriers because, according to the invention, it is ruled out that the coil axis of the partner coil is positioned perpendicular to the coil axis of a code carrier coil.

According to a subordinate variant of this, the partner device can only be transported in one or in two of the spatial directions x, y and z.

By the same token, a logistics system can have a conveying device with, for example, one or more conveyor belts, optionally with branch-offs, whereby the conveying device can transport, for instance, cuboidal or cylindrical objects each with a code carrier having a code carrier coil that is arranged parallel to a side surface of the appertaining cuboidal object or cylinder or parallel to a cover surface of the appertaining cylindrical object, in one or two horizontal directions, whereby the objects lie on the conveyor belt or conveyor belts, so that the coil axes of the code carrier coils are oriented vertically or horizontally (with otherwise any random orientation of the objects and of the code carrier coils), and whereby the partner device (or at least the partner coil) is directionally stable and optionally stationary, and the coil axis of the partner coil is slanted relative to the horizontal by an angle between 5° and 85°. Thus, it is ensured here as well that the direction of the coil axis of the partner coil always differs from the direction of the coil axes of all of the code carrier coils by an angle between 5° and 85°. In this manner, the partner device can likewise communicate with all of the code carriers because, according to the invention, it is ruled out that the coil axis of the partner coil is positioned perpendicular to the coil axis of a code carrier coil.

A11 According to a preferred embodiment of the invention, the code carrier has a data storage unit containing a data code associated with the object or with its contents and it is capable of inductively transmitting this data code via the code carrier coil to the partner device, thereby supplying information associated with the object or with its contents to the partner device.

In such a case, the code carrier can be designated as the code transmitter, the code carrier coil as the code transmitting coil, the partner device as a detection device or as a receiving device, and the partner coil as the receiving coil.

According to the invention, the code carrier is capable of communicating at least unidirectionally with the partner device via the code carrier coil. According to an embodiment of the invention, the code carrier is capable of transmitting data inductively to the detection device, but it is not capable of inductively receiving data from the partner device. Therefore, according to this embodiment, a data flow is only provided from the code carrier to the partner device but not vice versa.

A12 In another embodiment of a code carrier according to the invention or of a code carrier set according to the invention, data can be transmitted inductively from the partner device via the code carrier coil to the code carrier, so that, via the code carrier coil, the code carrier is capable of receiving data that has been transmitted inductively from the partner device. Thus, here a data flow is provided from the partner device to the code carrier.

In yet another embodiment of a code carrier according to the invention or of a code carrier set according to the invention, the code carrier has an additional code transmitter coil by means of which data can be transmitted inductively from the partner device to the code carrier so that, via the additional code transmitter coil, the code carrier is capable of receiving data that has been transmitted inductively from the partner device.

In another embodiment of a code carrier according to the invention or of a code carrier set according to the invention, the code carrier is capable of inductively transmitting the data code to the partner device and it is also capable of receiving data from the partner device in a manner that is time-shifted thereto. In another embodiment of a code carrier according to the invention or of a code carrier set according to the invention, the code carrier is capable of inductively transmitting the data code to the partner device and it is also capable of receiving data from the partner device at the same time.

Consequently, in the two latter cases, bidirectional communication, in other words, bidirectional data flow, is possible between the code carrier and the partner device.

A13 Preferably, the data storage unit can be written with data in a contact-free manner from the outside in that an electromagnetic alternating field is induced into the code carrier coil. In particular, the existing data code is overwritten and replaced by a new, updated data code. The data can especially be data that is inductively transmitted by the partner device.

A14 According to a variant of the invention, the base area of the object is rectangular or essentially rectangular.

A15 According to a preferred embodiment of the invention, the object is essentially shaped like a cuboid, whereby the code carrier coil is arranged in the area of an edge or a corner of the cuboid. The cuboid can especially be a cube. The object can especially be a transportation container to whose contents the data code refers. The cuboid can have, for example, top, bottom and/or side surfaces made up of grids or else it can be an open, for example, basket-like container.

Normally, cuboidal objects, for example, in the sectors of shipping or warehousing, are transported by means of conveying devices in one, two or all three spatial directions, in each case parallel to one of its edges. Objects having a rectangular base area are normally transported by means of the conveying devices in one or two spatial directions parallel to an edge of the base area and optionally in the third spatial direction perpendicular to the base area. Consequently, in these cases, according to the invention, the code carrier coil is positioned obliquely to at least two of these spatial directions.

The partner device preferably has one or more reading heads, each equipped with a partner coil. Preferably, the coil axes of the partner coils are each oriented parallel to a possible direction of movement of the object on the conveying device.

A16 The code carrier coil can be configured as an open or closed ring shaped like a rectangle, whereby each side of this rectangle runs parallel to two of the six side surfaces of the object or lies parallel against one side surface of the object. A17 The code carrier coil can especially be a component of a prism-like edge protector that can be placed or mounted from the outside onto the area of an edge of the object in such a way that the edge protector covers the area of this edge of the object.

A18 Preferably, the code carrier coil is configured as an open or closed ring shaped like a triangle or it is configured in such a way that the projection of the code carrier coil in the direction of the coil axis is shaped like a triangle. A19 Preferably, each side of the triangle runs parallel to two of the six side surfaces of the object, whereby a body diagonal of the object pierces the interior of the triangle.

A20 The code carrier coil or the entire code carrier, including the code carrier coil, can be a component of a cap that can be placed from the outside in a stable position onto the area of a corner of the object in such a way that the cap covers the area of this corner of the object, functioning as a physical corner protector. The code carrier coil can be embedded, for example, in the cap or glued onto it on its inside or outside. The cap can especially be configured as a corner protector.

A21 The cap can especially be shaped like a pyramid. A22 Here, the tip of the pyramid can be truncated. A23 At least one of the edges of the pyramid is preferably reinforced with metal or with another hard material.

A24 According to another embodiment, the code carrier coil is configured as an open or closed circular ring.

A25 The code carrier coil can be arranged, for example, on a carrier that is attached to the object by means of a holder so as to be directionally stable or non-rotatable or rigid.

A26 The code carrier can have a power storage device that can be charged with electric power contact-free from the outside in that an electromagnetic alternating field is induced from a charging coil into the code carrier coil and this power is sufficient to at least once inductively transmit the data code associated with the object or with its contents to the partner device via the code carrier coil.

In this manner, there is no need for a power supply for the code carrier, e.g. by means of a battery. The power storage device can be configured, for example, as a capacitor or as an accumulator. According to another variant, the code carrier has a non-rechargeable battery as the source of power.

According to a preferred embodiment, the charging coil is formed by the partner coil, that is to say, they are one and the same. The code carrier coil and the partner coil are induction coils.

A27 The code carrier is preferably arranged on an object that moves relative to the partner device and it is capable of communicating inductively with the partner device via the code carrier coil during this relative movement between the object and the partner device. In particular, the partner device can be stationary and the object with the code carrier can be in motion. By the same token, conversely, the object with the code carrier can be stationary and the partner device can be in motion.

Thus, according to a preferred variant, the invention relates to a code carrier or data carrier having a single code carrier coil that is mounted, for example, on a corner of the object that is to be identified and that can be read or written from all three spatial axes.

The code carrier or data carrier according to the invention preferably consists of a code carrier coil wound in a plane, of a chip and of a holding carrier. The coil is preferably arranged in such a plane at an angle relative to the directions of movement that it is flooded by the magnetic field of the reading system from all three spatial axes and so that the projected surface area of the coil from all three axes does not disappear. The reading system or the partner device is preferably arranged outside of the space in which the object travels.

Preferably, the coil axes of the partner coils are each oriented parallel to a possible direction of movement of the object on or in the conveying device. Therefore, for example, the coil axis of a first partner device can be oriented in the x-direction, that of a second partner coil in the y-direction and that of a third partner device in the z-direction, if the x, y and z directions are the possible directions of movement of the object on or in the conveying device and if they are arranged, for example, perpendicular to each other. The orientation of a third partner coil in a direction perpendicular to the x and y-directions is also advantageous, even if only the x and y-directions are possible directions of movement of the object in or on the conveying device.

Here, all of the partner coils are preferably connected to the partner device. The code carrier coil can be wound, for example, triangularly, so that it takes up little space when placed over a corner of the object.

It can also be wound in a round shape so that it can be produced on a simple cylindrical tool. Thus, it is possible to install the code carrier coil in a ferrite pot core. Then the inductivity of the coil is less influenced by an object made of a magnetically active material. However, it is also possible to use commercially available round data carriers that might already have a pot core and that are suitable for installation in metal, and to simply add a holder to create an arrangement at an angle on the object. One or more assembly holes are preferably situated on the holding carrier. Holding carriers designed specifically to be glued in place preferably do not have a hole. The holding carriers can be produced with or without a tip (for purposes of better placement onto the part to be identified).

The data carrier can be read from all spatial axes (from the front, the side, perpendicular) and can be mounted onto the corner by being slipped on like an edge protective strip or corner protector. It can also be produced as a true edge protective strip in that an encircling metal edge that is "not electrically connected" is cast into it or installed in it. It can also be mounted in the "conventional manner" upright beyond the corner.

The invention entails, among other things, the following advantages: The data carrier or code carrier requires only one coil system; the coil system only has to be wound in one plane and can therefore be produced very simply; the data carrier or code carrier can be read from all spatial axes; in the triangular version, it has a minimum installation height with a maximum coil surface area; according to a preferred embodiment of the invention, it can be mounted onto the corner by slipping it on like an edge protective strip; it can also be produced as a true edge protective strip; according to another variant, it can be mounted upright beyond the corner, so as to be secured against gliding; it has a longer read/write range than systems with several coil systems; it is easy to produce; according to a preferred embodiment, it can be stacked for storage and transportation purposes; in a preferred embodiment, it can be read on metallic objects; it can be affixed with a single screw; it can be glued in place.

By the same token, the code carrier according to the invention can be written from all three axial directions in space, if it is configured to receive and store data transmitted inductively by the detection device. If the code carrier is configured to be charged inductively with electric power by the detection device, then this applies in a completely corresponding manner here.

Another essential advantage of the code carrier according to the invention or of the code carrier set according to the invention results from the fact that only one single transmitting coil is needed because in this way, it is possible to rule out a destructive superimposition of the electromagnetic fields of several transmitting coils and thus the formation of "blind zones" (that is to say, field-free or almost field-free zones) that impair data transmission or even make it impossible.

All advantages that the invention entails when reading out the code carrier by means of the partner device (in the embodiments of the invention in which a data flow from the code carrier to the partner device is provided) also exist when, conversely, the code carrier or its data storage unit is written or overwritten by the partner device (in the embodiments of the invention in which a data flow from the partner device to the code carrier is provided).

All of these advantages exist in a totally equivalent manner when, with a code carrier set according to the invention, instead of the axis of the code carrier coil, the coil axis of the partner coil is oriented in the manner according to the invention, as is the case, for example, according to the teaching of Claims 7 to 10.

BRIEF DESCRIPTION OF THE DRAWING WHICH SCHEMATICALLY SHOWS

Figure 2:
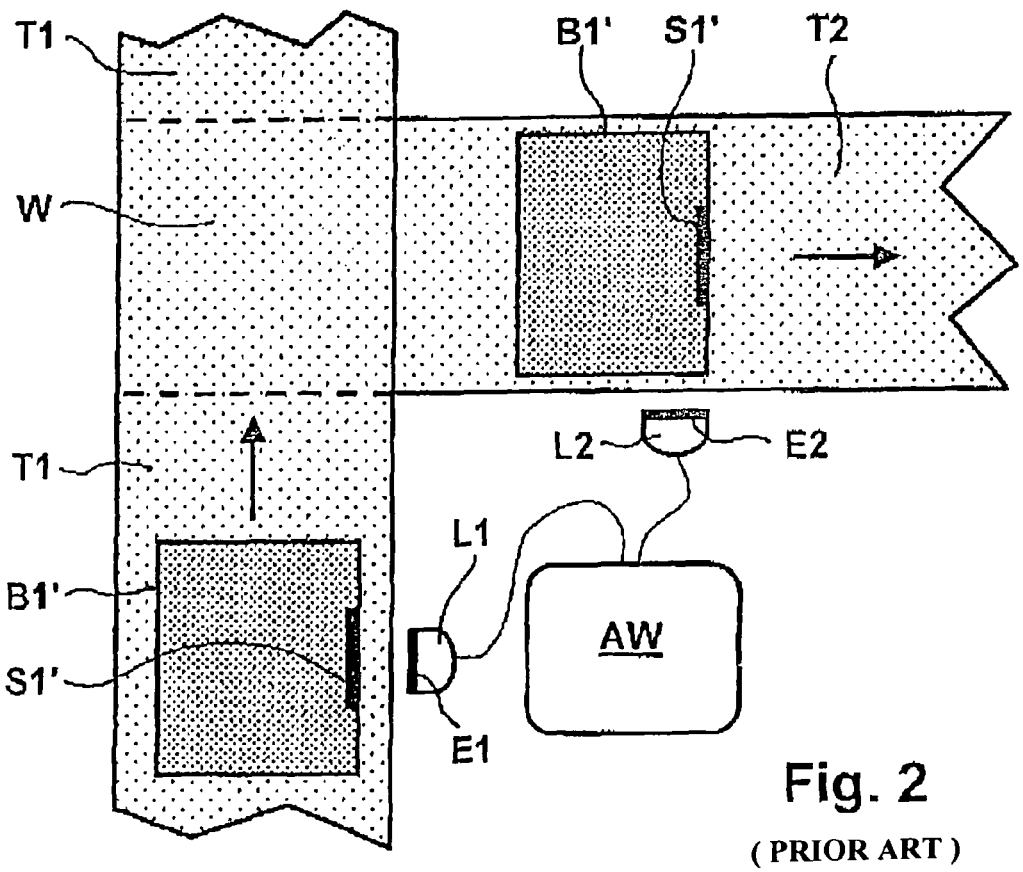
Figure 3:
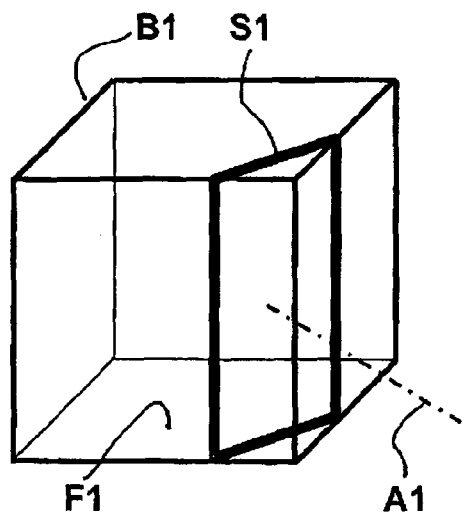
Figure 6:
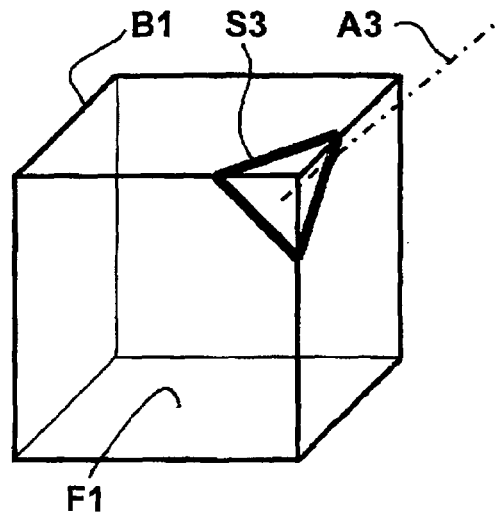
Figure 9:
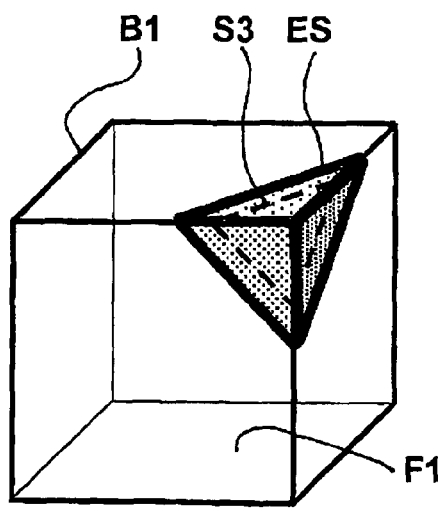
Figure 10:
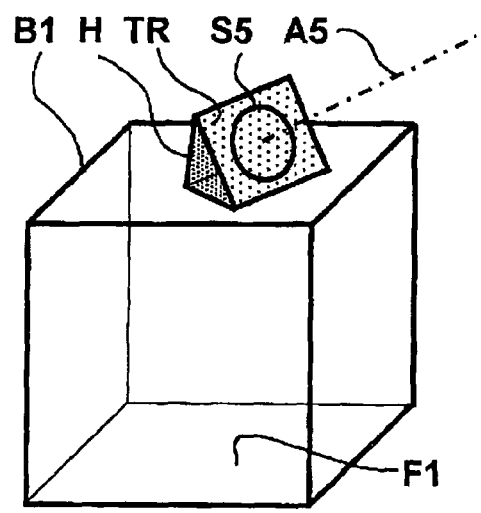
Figure 4:
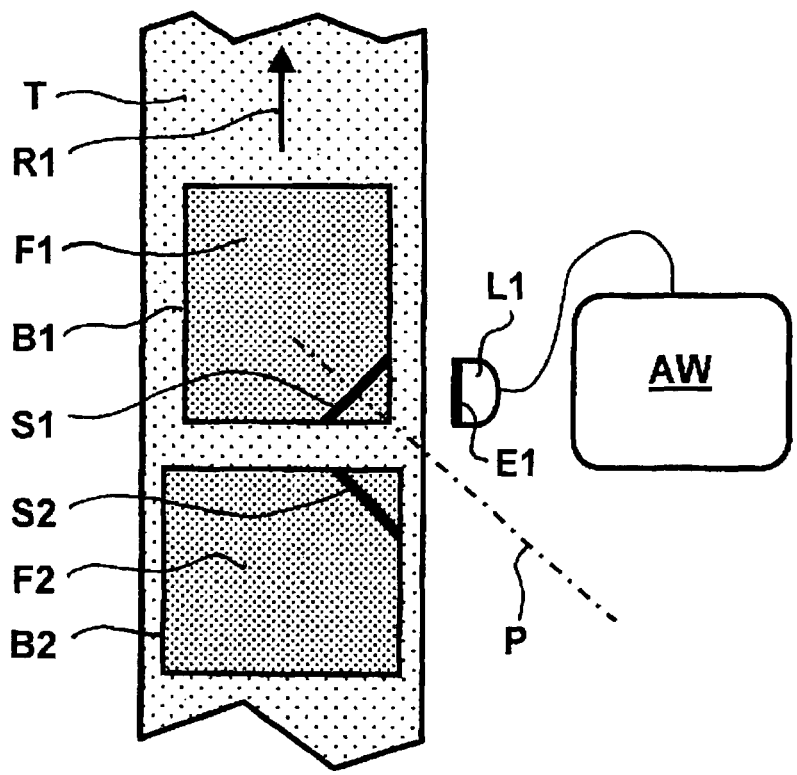
Figure 5:
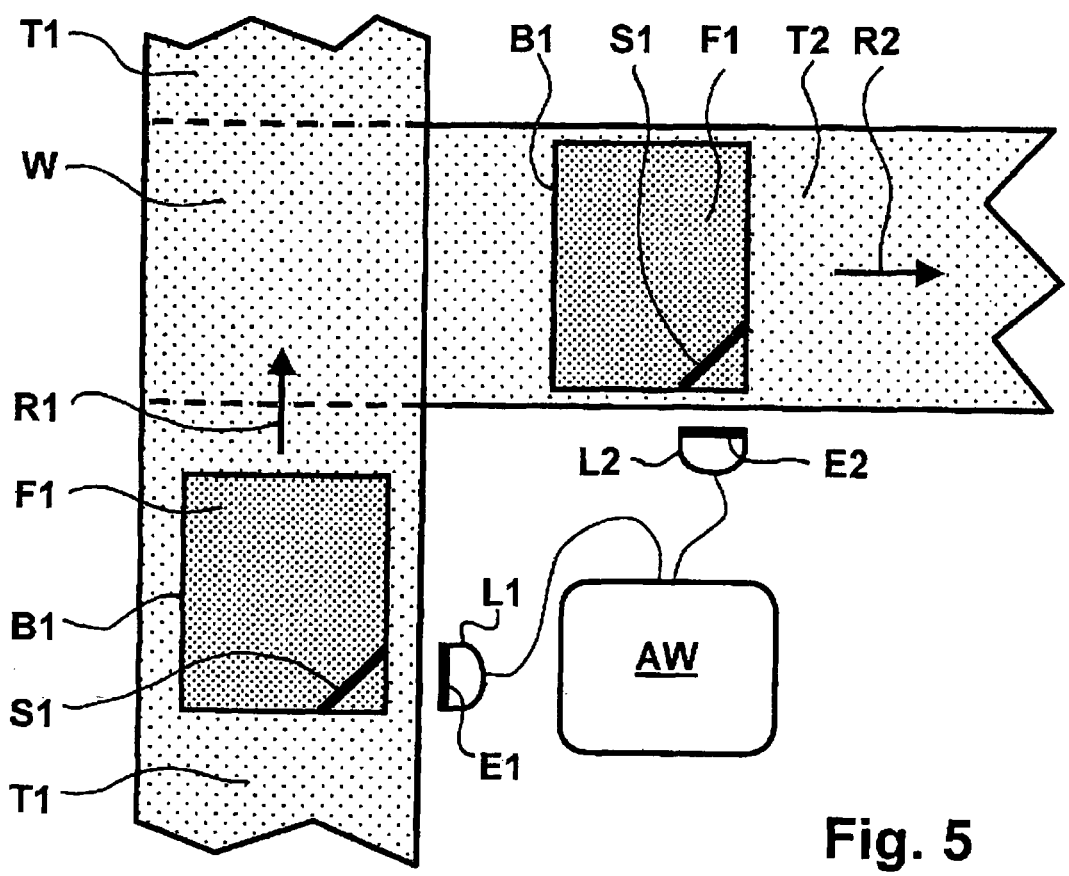
Figure 7:
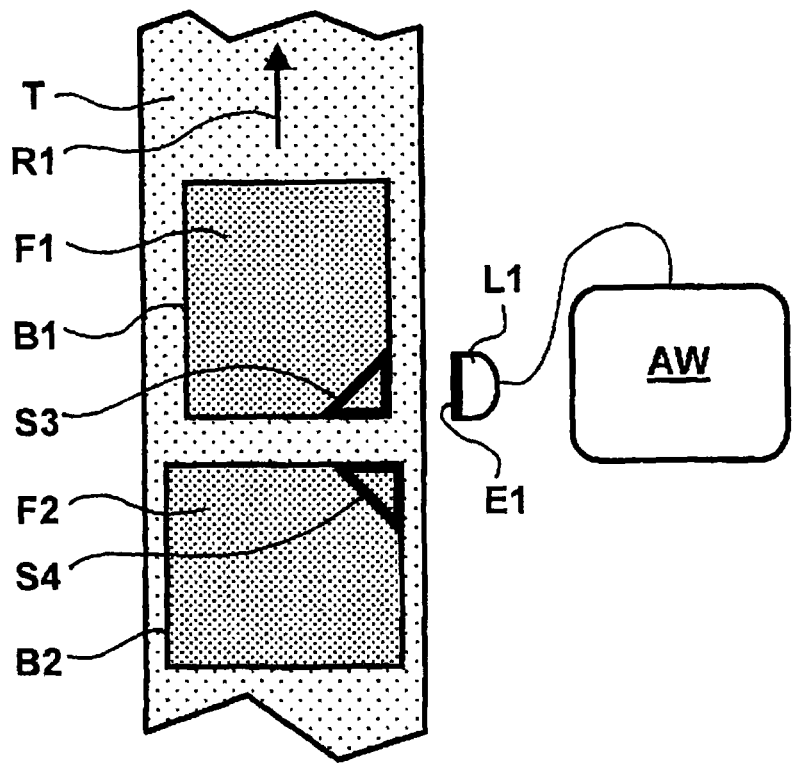
Figure 8:
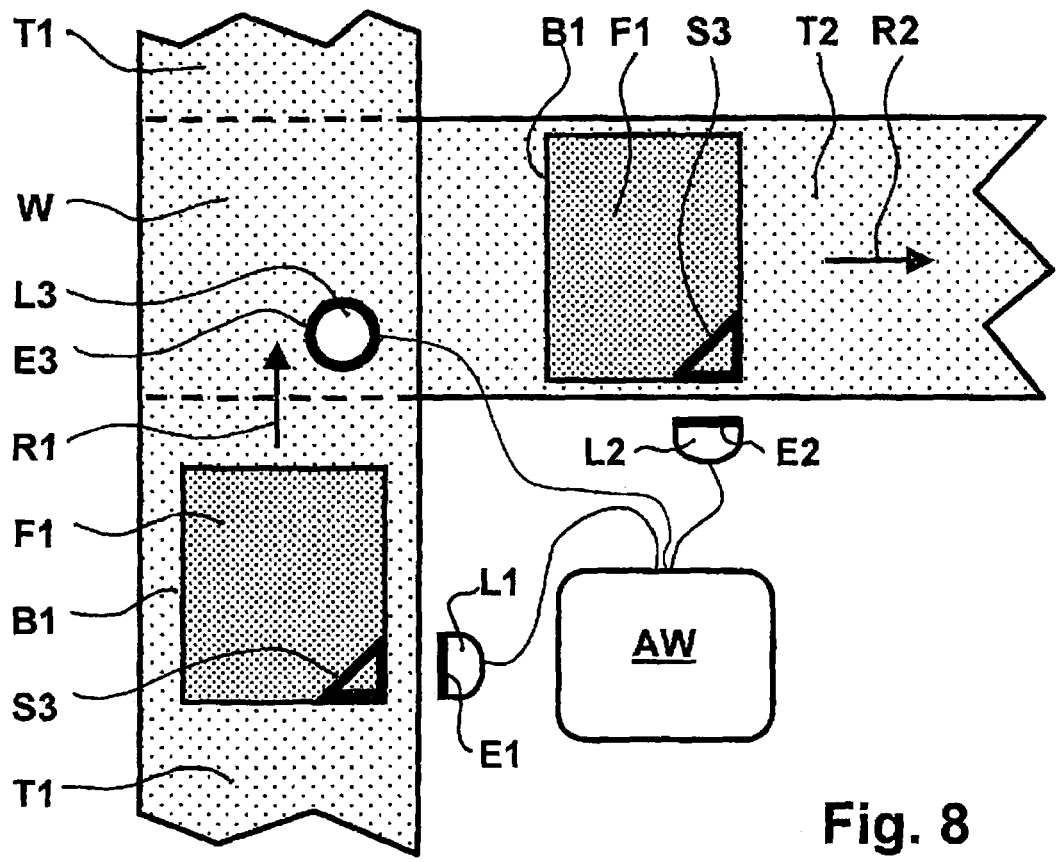
Figure 11:
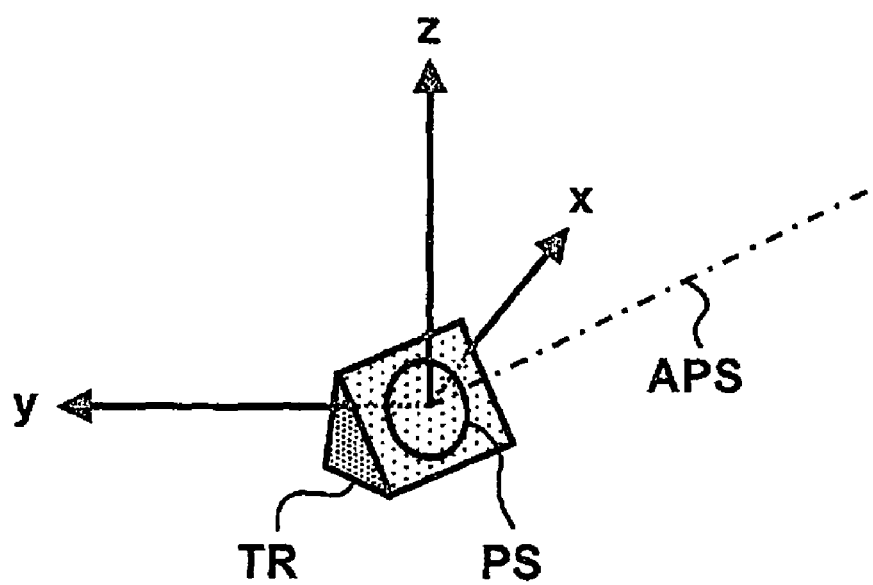
Figure 12:
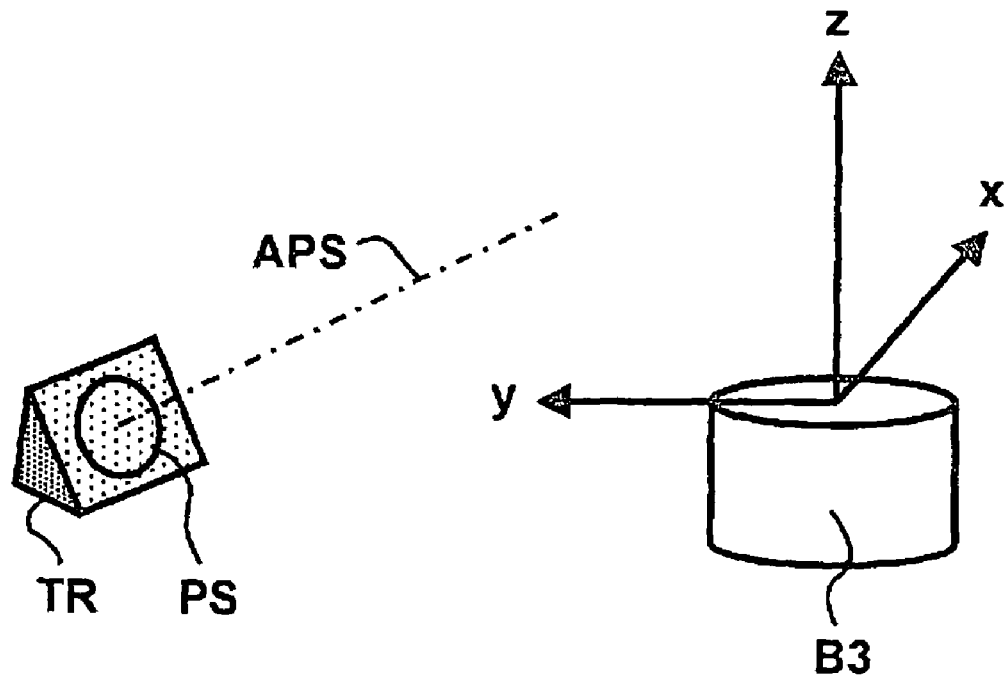

FIG. 1 for further illustrating the state of the art, a top view of a transport belt with two containers placed on it, which are each provided in a conventional manner with a code transmitter and which consecutively pass a receiving device, FIG. 2 for further illustrating the state of the art, a top view of a transport belt from which, another transport belt branches off via a shunt, whereby the position of a container that is provided with a code transmitter in a conventional manner is shown at two different points in time, FIG. 3 an embodiment of a code carrier set according to the invention in a perspective view, FIG. 4 the transport belt and the receiving device of FIG. 1 in a top view, whereby two code carrier sets according to the invention as depicted in FIG. 3 have been put onto the transport belt, FIG. 5 the transport belts of FIG. 2 in a top view, whereby the position of a code carrier set according to the invention as depicted in FIG. 3 is shown at two different points in time, FIG. 6 another embodiment of a code carrier set according to the invention in a perspective view, FIG. 7 the transport belt and the receiving device of FIG. 1 in a top view, whereby two code carrier sets according to the invention as depicted in FIG. 6 have been put onto the transport belt, FIG. 8 the transport belts of FIG. 2 in a top view, whereby the position of a code carrier set according to the invention as depicted in FIG. 6 is shown at two different points in time, FIG. 9 a refined embodiment of the code carrier set according to the invention of FIG. 6 in a perspective view, FIG. 10 another embodiment of a code carrier set according to the invention in a perspective view, FIGS. 11 and 12 additional embodiments of the invention.

FIGS. 1 to 10 all relate to code carriers with a code carrier coil by means of which the code carrier can transmit data inductively to a partner device, that is to say, a data flow is provided from the code carrier to the partner device. Thus, the code carrier inductively emits or transmits data via the code carrier coil to the partner device, which receives, that is to say, acquires, the data via a partner coil. Therefore, below, making reference to FIGS. 1 to 10, the code carrier is designated as the code transmitter, the code carrier coil as the transmitting coil, the partner device as the detection device or receiving device, and the partner coil as the receiving coil.

FIG. 1 serves to further illustrate the state of the art. Two objects, namely, two identical containers B1', B2', have been placed onto a transport belt T and they have each been provided in a conventional manner with an inductive code transmitter, each having a transmitting coil S1' or S2', respectively. Only the transmitting coils of the code transmitters are shown. The containers B1', B2' are transported by the transport belt T in the direction of the arrow, while consecutively passing the reading head L1 of a receiving device E1, L1, AW, consisting of an evaluation device AW and the one reading head L1 connected to it, containing a receiving coil E1 whose coil axis is oriented parallel to the surface of the transport belt T and perpendicular to the arrow direction (direction of movement).

The inductive code transmitters each have a data storage unit (not shown here) and they are provided to inductively transmit a data code stored there from the transmitting coil S1', S2' into the receiving coil E1 when passing the detection device E1, L1, AW. Only the transmitting coils S1', S2' of the code transmitters are shown. In accordance with the state of the art, the transmitting coils S1', S2' are applied onto a surface of the containers B1', B2' parallel thereto, for example, glued on as a film. In the case of container B1', the transmitting coil S1' is attached to the surface of the container that is across from the receiving coil while the container is passing the receiving coil, i.e. the axes of the transmitting coil S1' and of the receiving coil E1 run parallel to each other.

However, this can only be achieved if the container B1' is placed onto the transport belt T with a prescribed orientation. In contrast, if the container has been placed onto the transport belt, for example, rotated by 90° with respect to this preferred orientation, as depicted in FIG. 1 in the case of the container B2' that is identical to the container B1', then the axes of the transmitting coil and of the receiving coil are crosswise to each other while they are passing the reading head L1, which makes an inductive data transmission very difficult or impossible.

Consequently, in the state of the art, a prescribed fixed orientation of the containers relative to the transport belt has to be ensured, which is a disadvantage. However, even if this can be ensured by accepting the effort involved, the above-mentioned disadvantage still occurs in the case of branched conveying systems. An example of this is illustrated in FIG. 2.

FIG. 2 serves to further illustrate the state of the art and shows a branched conveying system T1, W, T2, namely, a transport belt T1, often called a lengthwise conveyor, from which another transport belt T2, also called a crosswise conveyor T2, branches off, whereby the position of the container B1' is shown at two different points in time. At first, the container B1' is on a transport belt T1 on which it passes the reading head L1, whereby the desired data transmission from the data storage unit of the code transmitter into the evaluation device AW takes place. Subsequently, the container B1' is guided through the shunt W onto a transport belt T2 running towards the right, whereby the spatial orientation of the container B1' remains unchanged if the shunt W is of the type usually used in branched conveying systems.

Next to the transport belt T2, there is another reading head L2 that is identical to the reading head L1, but that is rotated relative to the latter by 90° in the direction of the transport belt T2 and that is likewise connected to the evaluation device AW. The reading head L2 contains receiving coil E2. The reading head L2 is intended, for example, to check whether the container B1' was guided properly through the shunt W onto the transport belt T2. Such checking procedures are common and often indispensable in branched conveying systems, for example, in shipping or warehousing operations. However, now the axes of the transmitting coil S1' and of the receiving coil E2 are arranged crosswise to each other while they are passing this reading head L2, once again resulting in the drawback explained, namely, that an inductive data transmission is not possible.

FIG. 3 shows an embodiment of a code transmitter set according to the invention consisting of an object, namely, a cuboidal container B1, and of a code transmitter arranged on it. The code transmitter has a data storage unit (not shown here) containing a data code associated with the contents of the container B1 and it has a transmitting coil S1 and it is capable of inductively transmitting this data code via the transmitting coil S1 to a detection device that is situated at a distance from the container B1, thereby supplying information associated with the contents of the container B1 to the detection device. FIG. 3 shows only the transmitting coil 1 of the code transmitter.

The container B1 drawn in FIG. 3 so as to be transparent has a rectangular base area F1. According to the invention, the transmitting coil S1 is oriented relative to the container B1 in such a way that the vertical projection of the coil axis A1 of the transmitting coil S1 onto the base area F1 of the container B runs obliquely to the edges of the base area F1. Preferably, the vertical projection P (FIG. 4) of the coil axis A1 on the base area F1 intersects two edges of the base area F1, in each case, at an angle between 40° and 50°, preferably 45°. The transmitting coil S1 is configured as an open or closed ring shaped like a rectangle, whereby each side of this rectangle lies parallel against one side surface of the container B1, and is arranged in the area of an edge of the container B1.

FIG. 4 shows the transport belt T and the receiving device E1, L1, AW of FIG. 1 in a top view, whereby two code transmitter sets according to FIG. 3 that are identical but rotated by 90° relative to each other have been placed onto the transport belt T, namely, a code transmitter set with the container B1 and a code transmitter, of which only the transmitting coil S1 is shown, as well as a code transmitter set with the container B2 and a code transmitter, of which only the transmitting coil S2 is shown. Consequently, each of these code transmitter sets consists of at least one container and one code transmitter.

Due to the oblique positioning of the transmitting coil S1, a component of the alternating field emitted by the transmitting coil S1 floods the receiving coil E1 of the reading head L1 when the reading head L1 is being passed, so that an inductive data transmission from the code transmitter to the evaluation device AW can take place.

Due to the oblique positioning of the transmitting coil S2, regardless of the 90°-rotation, a component of the alternating field of the transmitting coil S1 likewise floods the receiving coil E1 when the reading head L1 is being passed, so that advantageously, an inductive data transmission to the evaluation device AW is also possible here without any problem.

If the code carriers are also configured conversely to receive and to store data transmitted inductively by the reading head L1 via the transmitting coils S1 or S2, then this is also possible in the case of object B1 as well as in the case of object B2, once again regardless of the 90°-rotation of the transmitting coil S2 relative to the transmitting coil S1.

FIG. 5 shows the branched conveying device T1, W, T2 of FIG. 2 in a top view, whereby the position of a code transmitter set according to the invention as depicted in FIG. 3 is shown at two different points in time, namely, once before and once after passing the shunt W. The transport belt T1 conveys the container B1 in a direction R1 before it passes the shunt W; after it passes the shunt W, the transport belt T2 conveys the container B1 in a direction R2 that is perpendicular thereto. Due to the oblique positioning of the transmitting coil S2, a component of the alternating field of the transmitting coil S1 floods the receiving coil E1 of the reading head. L1 when the reading head L1 is being passed; a component of the alternating field of the transmitting coil S1 likewise floods the receiving coil E2 of the reading head L2 when the reading head L2 is being passed. Hence, in both cases, an inductive transmission of the data code into the evaluation device AW is advantageously possible here without any problem.

FIG. 6 shows another embodiment of a code transmitter set according to the invention in a perspective view, with the container B1 and a code transmitter having a triangular transmitting coil S3 which is present instead of the rectangular transmitting coil S1 of FIG. 3, while the code transmitter remains otherwise unchanged. The coil axis A3 of the transmitting coil S3 is oriented obliquely to the base area F1 of the container B1, preferably at an angle between 40° and 50°, especially preferably 45°. The transmitting coil S3 is in the area of a corner of the cuboid B1 and is pierced by a body diagonal of the cuboid B1. Each side of the triangle S3 runs parallel to two of the six side surfaces of the cuboid B1.

FIG. 7 shows the transport belt T and the receiving device E1, L1, AW of FIG. 1 in a top view, whereby two code transmitter sets according to FIG. 6 that are identical but rotated by 90° relative to each other have been placed onto the transport belt T, namely, a code transmitter set with the container B1 and a code transmitter, of which only the transmitting coil S3 is shown, as well as a code transmitter set with the container B2 and a code transmitter, of which only the transmitting coil S4 is shown. Due to the oblique positioning of the transmitting coil S3, a component of the alternating field emitted by the transmitting coil S3 floods the receiving coil E1 when the reading head L1 is being passed, so that an inductive data transmission from the code transmitter to the evaluation device AW can take place. Due to the oblique positioning of the transmitting coil S4, regardless of the 90°-rotation of the container B2 relative to the container B1, a component of the alternating field of the transmitting coil S4 likewise floods the receiving coil E1 when the reading head L1 is being passed, so that advantageously, an inductive data transmission of the data code to the evaluation device AW is also possible here without any problem.

FIG. 8 shows the branched conveying device T1, W, T2 of FIG. 2 once again in a top view, whereby now the position of a code transmitter set according to the invention as depicted in FIG. 6 is shown at two different points in time, namely, once before and once after passing the shunt W. Due to the oblique positioning of the transmitting coil S3, an inductive transmission of the data code is once again advantageously possible, first via the receiving coil E1 and then via the receiving coil E2.

If the code carrier is also configured conversely to receive and to store data transmitted inductively by the reading heads L1 and L2 via the transmitting coil S1, then this is also advantageously possible, first via the receiving coil E1 and then via the receiving coil E2.

Another advantage is associated with the code transmitter set according to the invention shown in FIG. 6 in comparison to the one shown in FIG. 3 and in comparison to the state of the art. Due to the oblique positioning of the transmitting coil S3, also relative to the base area F1, an inductive transmission of the data code to a third reading head L3 with a receiving coil E3 is possible, said receiving coil E3 being perpendicular to each of the two other receiving coils E1, E2, since the receiving coil E3 is also flooded by a component of the alternating field of the transmitting coil S3. Therefore, the reading head L3 can be arranged especially above or below the conveying device T1, W, T2, for example, in the area of the shunt W. Hence, the reading head L3 can detect, for example, the material flow on both transport belts T1, T2 at the same time. The third reading head L3 is preferably likewise connected to the evaluation device.

The container B1 lying on the transport belts T1, T2 can be rotated or oriented in any desired way without this interfering with the transmission of the data code from the code transmitter to the reading head L3. Therefore, the container B1 can be placed onto the conveying device T1, W, T2 in any desired orientation, so that any swiveling of the container B1, even after it has been placed onto the conveying device, does not detrimentally affect the data transmission from the code transmitter to the reading head L3.

If the code carrier is also configured to receive and to store data transmitted inductively by the reading head L3 via the transmitting coil S1, then the container B1 lying on the conveying device T1, W, T2 can likewise be rotated or oriented in any desired way without this interfering with the transmission of the data code from the reading head L3 to the code carrier; in this case as well, any swiveling of the container B1 does not detrimentally affect the data transmission Consequently, with the invention, the stored contents of the code transmitter can be read into the evaluation device by means of a reading head oriented in a first direction of movement of the object as well as by means of a reading head oriented in a second direction of movement of the object perpendicular to the first direction of movement as well as by means of a reading head oriented in a direction of movement relative to the two directions of movement.

If the code carrier is also configured to receive and to store data transmitted inductively by the reading head via the transmitting coil S1, then this also applies to the reverse direction of the data flow, that is to say, for writing the code carrier with data.

If the code carrier is configured to be charged inductively with electric power from the reading head, then this applies in a completely corresponding manner here.

As a result, when the objects are transported by conveying installations, malfunctions due to non-observance of a prescribed orientation relative to the conveying installation can be greatly diminished. Moreover, the locations within the conveying installation that can be selected for the reading heads are much less restricted with the invention than is the case with the state of the art.

FIG. 9 shows a variant of the embodiment of the code transmitter set according to the invention of FIG. 6 in a perspective view, in which the transmitting coil S3 is an integral part of a pyramid-shaped cap ES that can be placed from the outside onto the area of a corner of the object B1 in such a way that the cap ES covers the area of this corner of the object B1. Consequently, the cap ES concurrently functions as a corner protector ES. Preferably, the cap lies against the container B1 without any space in between. The cap ES can be detachably connected to the container B1, for example, by a latching mechanism or by a snap-type mechanism or by a Velcro fastener.

FIG. 10 shows another embodiment of a code transmitter set according to the invention in a perspective view. This embodiment comprises the container B1 as well as a code transmitter with a circular transmitting coil S5 that is attached to a carrier TR for reinforcement purposes. The carrier TR is arranged directionally stably on the container B1 by means of a holder H so that the coil axis A5 of the transmitting coil S5 intersects all of the planes encompassed by the six side surfaces of the container B1 at an angle between 40° and 50°, preferably 45°. It is advantageous here that a commercially available circular coil that is inexpensive to produce can be used and that the transmitting coil can be installed in a ferrite pot core.

The containers B1, B2 are drawn in FIGS. 4, 5, 7 and 8 so as to be transparent, except for their base areas F1 and F2. Only the transmitting coil of the code transmitters is shown in all of the figures.

According to another embodiment of the invention, FIG. 11 schematically shows the partner coil PS of a code carrier set according to the invention, consisting of a code carrier (not shown) that is arranged on an object (not shown) and that has a code carrier coil (not shown), consisting of a partner device situated at a distance from the object that has a partner coil PS, and consisting of a transporting device (not shown) by means of which the partner device can be transported in the transporting directions x, y, z, whereby the code carrier is capable of communicating inductively with the partner device via the code carrier coil and via the partner coil, and whereby the direction of the coil axis APS of the partner coil PS is slanted relative to all three transporting directions x, y, z by an angle between 5° and 85°, preferably by an angle between 30° and 60°. The partner device PS is preferably arranged directionally stably on the transporting device, that is to say, in such a way that the spatial orientation of the coil axis APS of the partner coil PS does not change when the partner device PS is transported by means of the transporting device. For this purpose, the partner coil is attached to the transporting device, preferably by means of a carrier TR.

According to a subordinate variant of this, the partner device can only be transported in one or in two of the directions x, y and z. Preferably, the transport directions x, y both lie in the horizontal.

According to another embodiment of the invention, FIG. 12 schematically shows the partner coil PS of a code carrier set according to the invention, consisting of a code carrier (not shown) that is arranged on a cylindrical object B3 shown in the example of FIG. 12 and that has a code carrier coil (not shown), consisting of the partner device PS situated at a distance from the object B3 of FIG. 11 that has the partner coil PS, and consisting of a transporting device (not shown) by means of which the object B3, along with the code carrier, can be transported in the transporting directions x, y, z, whereby the code carrier is capable of communicating inductively with the partner device via the code carrier coil and via the partner coil PS, and whereby the direction of the coil axis APS of the partner coil PS is slanted relative to all three transporting directions x, y, z by an angle between 5° and 85°, preferably by an angle between 30° and 60°. The partner device PS is preferably mounted rigidly and thus directionally stably, for example, by means of a carrier TR, to the floor, a wall or the ceiling of a room or to another immovable object.

According to a subordinate variant of this, the object B3 can only be transported in one or in two of the directions x, y and z. Preferably, the conveying directions x, y both lie in the horizontal.

With the embodiments of FIG. 11 and FIG. 12, it is always advantageously possible to transmit data between the code carrier and the partner device when the object B3 is cuboidal or cylindrical, is lying on a horizontal substrate and the code carrier coil is arranged parallel to a horizontal wall (bottom surface or top surface) of the object B3, since then the axes of the code carrier coil and the partner coil always run obliquely to each other in any orientation of the object B3 that is lying on its horizontal substrate (whereby they do not have to intersect each other). Consequently, the orientation of the object B3 lying on its horizontal substrate, for example, a warehouse shelf or a conveyor belt, does not matter as long as its top is horizontal. The directions x, y, z do not have to be perpendicular to each other.

Therefore, the coil axis APS of the partner coil PS is oriented in such a way that the coil axis of the code carrier coil cannot be oriented perpendicular to the coil axis of the code carrier coil.

INDUSTRIAL APPLICABILITY

The invention has industrial applicability, for example, in warehousing, in shipping operations and in transportation logistics.

LIST OF REFERENCE NUMERALS

A1,A3,A5 coil axes of the transmitting coils S1,S3,S5
APS coil axis of the partner coil
AW evaluation device
B1,B1',B2,B2' cuboidal containers
B3 object
E1,E2,E3 receiving coils
ES cap as corner protector
F1,F2 base areas of B1,B2
H holder
L1,L2,L3 reading heads
P projection of A1 onto the plane of F1
PS partner coil
R1,R2 directions of movement of T1,T2
S1,S2,S3,S4,S5 transmitting coils
T,T1,T2 transport belts
TR carrier
W shunt
x,y,z transporting directions

The invention claimed is:

1. A code carrier that has a code carrier coil for communicating inductively with a partner device via the code carrier coil, characterized in that
the code carrier coil (S3) is configured as an open or closed ring (S3) shaped like a triangle (S3) or the projection of the code carrier coil (S3) in the direction of the coil axis (A3) is shaped like a triangle (S3),
the code carrier coil (S3) or the code carrier, including the code carrier coil (S3), is part of a cap (ES) that can be placed from the outside in a stable position onto an area of a corner of a cuboidal object (B1) in such a way that the cap (ES) covers the area of this corner of the cuboidal object (B1), functioning as a physical corner protector,
a coil axis (A3) of the code carrier coil (S3) intersects planes encompassed by six side surfaces of the cuboidal object (B1), all at an angle between 5° and 85°, preferably at an angle between 30° and 60°, and
a body diagonal of the cuboidal object (B1) pierces an interior of the triangle (S3).

2. The code carrier set according to claim 1, characterized in that
the code carrier has a data storage unit containing a data code for inductively transmitting this data code via the code carrier coil (S3) to a partner device.

3. The code carrier according to claim 1, characterized in that
the code carrier coil (S3, S4) or the code carrier, including the code carrier coil (S3, S4), is a component of a cap (ES) that can be placed from the outside in a stable position onto the area of a corner of the object (B1, B2) in such a way that the cap (ES) covers the area of this corner of the object (B1, B2), functioning as a physical corner protector.

4. The code carrier according to claim 3, characterized in that
the cap (ES) is shaped like a pyramid (ES).

5. The code carrier according to claim 4, characterized in that
a tip of the pyramid is truncated.

6. The code carrier according to claim 4, characterized in that
at least one of the edges of the pyramid (ES) is reinforced with metal or with another hard material.

7. The code carrier according to claim 1, characterized in that the code carrier has a power storage device that can be charged with electric power contact-free from the outside in that an electromagnetic alternating field is induced from a charging coil into the code carrier coil (S1, S2, S3, S4, S5) and this power is sufficient to at least once inductively transmit a data code associated with the cuboidal object (B1, B2) or with its contents to the partner device via the code carrier coil (S1, S2, S3, S4, S5).

8. The code carrier according to claim 1, characterized in that the code carrier is arranged on an object that moves relative to the partner device and wherein the code carrier can communicate inductively with the partner device via the code carrier coil (S1-S5) during a relative movement between the object and the partner device.

9. A code carrier set, consisting of at least one object having a base area with a first edge and a second edge running obliquely, crosswise or perpendicular to the first edge, and consisting of a code carrier that is arranged on or in the object and that has a code carrier coil for communicating inductively via the code carrier coil with a partner device situated at a distance from the object, characterized in that in each case, a perpendicular projection of a coil axis (A1, A3, A5) of the code carrier coil (S1, S2, S3, S4, S5) onto the base area (F1, F2) of the object (B1, B2) runs obliquely to the first and second edges of the base area (F1, F2) of the object (B1, B2).

10. The code carrier set according to claim 9, characterized in that the perpendicular projection of the coil axis (A1, A3, A5) of the code carrier coil onto the base area (F1, F2) of the object (B1, B2) runs in each case at an angle between 5° and 85°, preferably at an angle between 30° and 60°, with respect to the first and second edges of the base area (F1, F2).

11. The code carrier set according to claim 9, characterized in that
the coil axis (A3, A5) of the code carrier coil (S3, S4, S5) is also oriented obliquely to the base area (F1, F2) of the object (B1, B2).

12. The code carrier set according to claim 11, characterized in that
the coil axis (A1, A3, A5) of the code carrier coil (S3, S4, S5) intersects a plane encompassed by the base area (F1, F2) at an angle between 5° and 85°, preferably at an angle between 30° and 60°.

13. The code carrier set according to claim 9, characterized in that
the code carrier has a data storage unit containing a data code associated with the object (B1, B2) or with its contents and it is capable of inductively transmitting this data code via the code carrier coil (S1-S5) to a partner device, thereby supplying information associated with the object or with its contents to the partner device.

14. The code carrier set according to claim 13, characterized in that
the data storage unit of the code carrier can be written with data in a contact-free manner from the outside in that an electromagnetic alternating field is induced into the code carrier coil (S1, S2, S3, S4, S5).

15. The code carrier set according to claim 9, characterized in that the base area (F1, F2) of the object (B1, B2) is rectangular or essentially rectangular.

16. The code carrier set according to claim 15, characterized in that the object (B1, B2) is essentially shaped like a cuboid, and the code carrier coil (S1, S2, S3, S4, S5) is arranged in the area of an edge or corner of the cuboid (B1, B2).

17. The code carrier set according to claim 16, characterized in that the code carrier coil (S1, S2) is configured as an open or closed ring (S1) shaped like a rectangle, whereby each side of this rectangle runs parallel to two of the six side surfaces of the object (B1, B2) or lies parallel against one side surface of the object (B1, B2).

18. The code carrier set according to claim 9, characterized in that
the code carrier coil (S1, S2) is a component of a prism-like edge protector that can be placed or mounted from the outside onto an area of an edge of the object (B1, B2) in such a way that an edge protector covers the area of this edge of the object (B1, B2).

19. The code carrier set according to claim 9, characterized in that
the code carrier coil (S3, S4) is configured as an open or closed ring (S3, S4) shaped like a triangle (S3, S4) or a projection of the code carrier coil (S3, S4) in a direction of a coil axis (A3) is shaped like a triangle.

20. The code carrier set according to claim 19, characterized in that
each side of the
triangle (S3, S4) runs parallel to two of six side surfaces of the object (B1, B2), whereby a body diagonal of the object (B1, B2) pierces the interior of the triangle (S3, S4).

21. The code carrier set according to claim 9, characterized in that the code carrier coil (S5) is configured as an open or closed circular ring (S5).

22. The code carrier set according to claim 9, characterized in that the code carrier coil (S5) is arranged on a carrier (TR) that is attached to the object (B1) by means of a holder (H) so as to be directionally stable or non-rotatable or rigid.

23. A code carrier set, consisting at least of
a code carrier that is arranged on an object and that has a code carrier coil,
a partner device that is situated at a distance from the object and that has a partner coil,
a conveying device by means of which the object, along with the code carrier, can be transported in at least one conveying direction, or else consisting of a transporting device by means of which the partner device can be transported in at least one transporting direction,
whereby the code carrier can communicate inductively with the partner coil via the code carrier coil and via the partner coil, characterized in that
a direction of a coil axis of the partner coil is slanted
relative to at least one of the conveying directions
or relative to at least one of the transporting directions
by an angle between 5° and 85°, preferably by an angle between 30° and 60°.

24. The code carrier set according to claim 23, characterized in that
at least two of the conveying directions lie in one conveying plane, and the direction of the coil axis of the partner coil is slanted relative to the conveying plane by an angle between 5° and 85°, preferably by an angle between 30° and 60°,
or at least two of the transporting directions lie in one transporting plane, and the direction of the coil axis of the partner coil is slanted relative to the transporting plane by an angle between 5° and 85°, preferably by an angle between 30° and 60°.

25. The code carrier set according to claim 23, characterized in that
at least one of the conveying directions lies in a horizontal, and a direction of the coil axis of the partner coil is slanted relative to the horizontal by an angle between 5° and 85°, preferably by an angle between 30° and 60°,
or at least one of the transporting directions lies in the horizontal, whereby the direction of the coil axis of the partner coil is slanted relative to the horizontal by an angle between 5° and 85°, preferably by an angle between 30° and 60°.

26. The code carrier set according to claim 23, characterized in that
the code carrier and the partner device
are parts of a logistics system by means of which the object is automatically taken to a prescribed place,
or parts of a warehousing system, whereby the object is or holds goods to be stored and, by means of the warehousing system, the object can be automatically located and/or taken to a prescribed storage place.

27. The code carrier set according to claim 23, characterized in that
data can be transmitted inductively from the partner device via the code carrier coil (S1-S5) to the code carrier, so that the code carrier can receive data that has been transmitted inductively from the partner device via the code carrier coil (S1-S5),
or the code carrier has an additional code transmitter coil by means of which data can be transmitted inductively from the partner device to the code carrier so that, via the additional code transmitter coil, the code carrier is capable of receiving data that has been inductively transmitted from the partner device.

* * * * *